United States Patent

[11] 3,632,329

| [72] | Inventors | Richard M. Tillman;<br>Donald L. Whitfill, both of Ponca City, Okla. |
|---|---|---|
| [21] | Appl. No. | 19,565 |
| [22] | Filed | Mar. 16, 1970 |
| [45] | Patented | Jan. 4, 1972 |
| [73] | Assignee | Continental Oil Company<br>Ponca City, Okla. |

[54] REDUCTION OF MAGNESIUM IN FERTILIZER BASE SOLUTIONS
9 Claims, 2 Drawing Figs.

| [52] | U.S. Cl. | 71/34, 71/64 C, 23/107 |
|---|---|---|
| [51] | Int. Cl. | C05b 7/00 |
| [50] | Field of Search | 71/1, 34, 43, 51, 35, 36, 64 C; 23/107 |

[56] References Cited
UNITED STATES PATENTS

| 3,015,552 | 1/1962 | Striplin, Jr. et al. | 23/107 |
|---|---|---|---|
| 2,968,545 | 1/1961 | Nees et al. | 71/43 |
| 3,264,087 | 8/1966 | Slack et al. | 23/107 |
| 3,290,140 | 12/1966 | Young | 71/34 |

Primary Examiner—Reuben Friedman
Assistant Examiner—Charles N. Hart
Attorneys—Joseph C. Kotarski, Henry H. Huth, Robert B. Coleman, William A. Mikesell and Carroll Palmer ABSTRACT: A process for removing magnesium from ammonium phosphate fertilizer solutions by seeding the solution with magnesium ammonium pyrophosphate crystals while the temperature and pH of the solution are about 100° F. and about 6.2, respectively, and agitating the solution concurrently with the seeding.

INVENTORS
RICHARD M. TILLMAN &
DONALD L. WHITFILL

BY William A. Mikesell
ATTORNEY 3,632,329

REDUCTION OF MAGNESIUM IN FERTILIZER BASE SOLUTIONS

BACKGROUND OF THE INVENTION

1. Field of the Invention

This invention relates to a method for producing stable, clear fertilizer base solutions of ammonium phosphate. More specifically, the invention relates to a process for reducing the magnesium content of ammonium phosphate solutions derived from wet process phosphoric acid in order to prevent undesirable post precipitation of magnesium salts from such solutions.

2. Brief Description of the Prior Art

Wet process phosphoric acid contains many impurities which are also present in ammonium phosphate fertilizer base solutions derived from such acid. Such fertilizer solutions may be prepared by either the so-called super acid route in which superphosphoric acid is reacted with ammonia, or by the direct conversion route in which the merchant strength wet process acid is directly connected with gaseous ammonia. The ammonium phosphate solutions prepared by either method contain salts of various metallic ions, and a troublesome problem which is encountered with solutions derived from the super acid process is the precipitation from the solution during storage of magnesium ammonium pyrophosphate tetrahydrate (MAPT). The phosphate rock from which is derived the wet acid, and ultimately the fertilizer base solution, is seldom sufficient low in MgO content to prevent such post precipitation. A MgO level below about 0.17 weight percent is required for a nonprecipitating 10–34–0 solution (10 weight percent nitrogen, 34 weight percent $P_2O_5$ and 0 weight percent $K_2O$) at a pH of 6.2. By reducing the pH to 5.5, the tolerance of the system is increased to about 0.33 weight percent MgO.

Various methods have been previously proposed for reducing or eliminating the described post precipitation, including chelation of the metal cations in the solutions, sequestration of the offending metallic ions, and reducing the pH to increase the level of tolerance of magnesium salts, below which the undesirable precipitation will not occur. The economics of the described procedures render it desirable to determine alternate, less costly methods of reducing the post precipitation of magnesium salts from ammonium phosphate fertilizer base solutions, and particularly those derived from wet process superphosphoric acid where the precipitation of MAPT is more severe.

BRIEF DESCRIPTION OF THE PRESENT INVENTION

This invention provides a method for preventing post precipitation of magnesium salts from ammonium phosphate fertilizer base solutions prepared from wet superphosphoric acid. The method comprises seeding such solutions with MAPT crystals while maintaining the solution at a temperature of from about 100° F. to about 125° F. and at a pH of about 6.2 while thoroughly agitating the solution. The practice of the method results in a substantial decrease in the concentration of magnesium in the solution due to precipitation of MAPT. At the thus obtained lower level of magnesium concentration the solution will remain clear and stable over an extended period of time.

It is an object of the invention to stabilize ammonium phosphate base fertilizer solutions which are derived from wet process superphosphoric acid so that post precipitation of magnesium salts from such solutions is reduced to a tolerable level.

Another object of the invention is to provide a relatively low cost, semicontinuous process for reducing the magnesium content of aqueous base fertilizer solutions derived from wet process superphosphoric acid.

Other objects and advantages will become apparent as the following detailed description of the invention is read in conjunction with the accompanying drawings.

DETAILED DESCRIPTION OF PREFERRED EMBODIMENTS OF THE INVENTION

Figure 2:
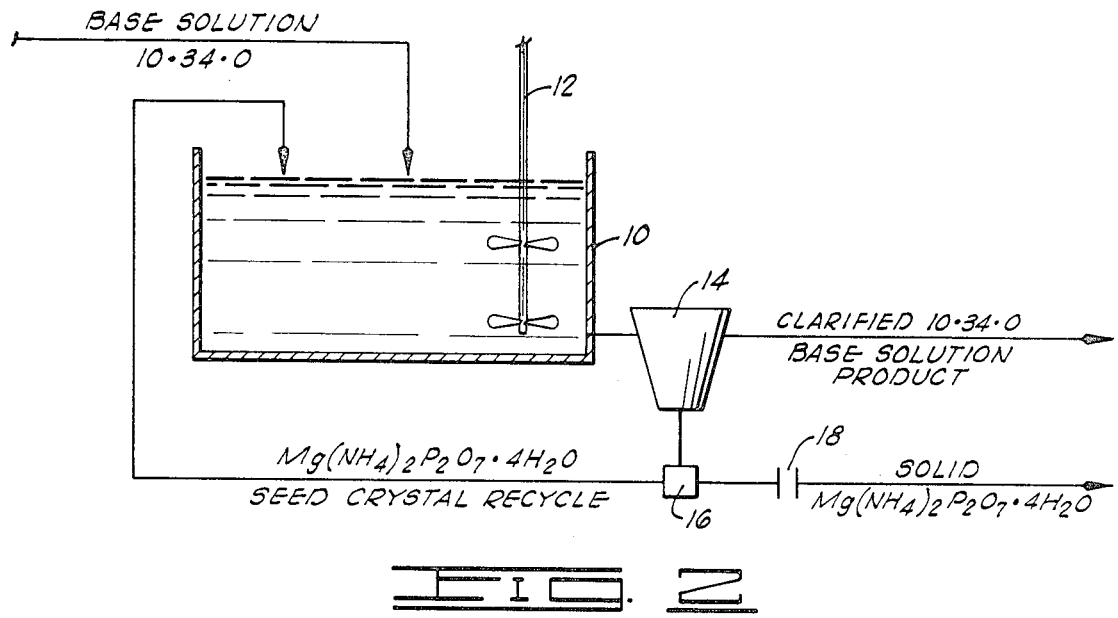
FIG. 2 is a schematic process flow diagram illustrating a preferred method of practicing the process of the present invention.

Liquid ammonium phosphate fertilizers are now produced from wet process phosphoric acid by ammoniating the acid. In one method of manufacturing the base fertilizer solution, superphosphoric acid containing both ortho- and polyphosphoric acids is ammoniated at a pH of about 6 to yield the ammonium phosphate solution. Since the wet process phosphoric acid is ordinarily prepared by treating phosphate rock with dilute sulphuric acid, it usually contains various acid soluble impurities which were present in the phosphate rock. Impurities which are almost always present, however, are slightly soluble magnesium salts. These salts constitute the most troublesome problem encountered with base solutions prepared from wet process superphosphoric acid since the magnesium, in the form of magnesium ammonium pyrophosphate tetrahydrate, tends to precipitate from the solution over periods of storage. The MAPT precipitate will appear in varying amounts and at varying time intervals after production of the base solution, and the "flocking" of the solutions and accumulation of sedimentation in the bottom of the storage containers reduces the saleability and ease of utilization of the base fertilizer solutions.

The time lag between the production of the liquid fertilizer solution and the appearance of the undesirable magnesium precipitate is dependent upon storage conditions. For example, at a storage temperature at about 75° F., the precipitate appears in 4 to 6 weeks in base solutions of the standard grades such as 10–34–0 and 11–37–0. The magnesium oxide concentration in these standard solutions is normally from about 0.330 to about 0.495 weight percent. Very little of the phosphate rock now produced is available with a sufficiently low MgO content to prevent magnesium post precipitation of the type described in the base solutions derived therefrom. For example, in the standard 10–34–0 base solution, a MgO level below 0.17 percent is required in order to avoid the occurrence of undesirable post precipitation over extended periods of time. By reducing the pH of this standard solution to about 5.5, the tolerance of the system for MgO is increased to about 0.33 weight percent. Both the higher and lower pH tolerance levels of magnesium in the product base solutions have been found difficult to achieve routinely, and several approaches to the problem of reducing or eliminating the undesirable post precipitation have been attempted as hereinbefore described.

In accordance with the present invention, it has been determined that post precipitation of MAPT can be very substantially reduced or eliminated by seeding the product base solutions with from about 2 weight percent to about 10 weight percent MAPT crystals while carefully controlling the conditions of pH and temperature prevalent in the base solution. During the addition of the seed crystals to the base solution, the solution is agitated. By the described technique, the MgO content of the base solutions can be reduced to within described tolerance levels in which the post precipitation problem is eliminated, and this can be accomplished over a time period of 3 to 5 days where the process is applied immediately to the fresh base solution, or within 3 to 7 hours where the base solution is aged for a period of several days prior to commencing the seeding procedure. The pH and temperature conditions under which we have found the seeding with agitation must be carried out are a pH of from about 6.2 to about 7, and a temperature of from about 100° F. up to about 125° F. Preferably, the pH of the base solution is maintained at about 6.2 and the temperature is maintained at 100°–105° F. during this seeding.

The following examples demonstrate the practice of the invention and illustrate the criticality of certain process conditions which are to be utilized in the practice of the process. In all of the examples, the seed nuclei which were used for seeding by addition to the seeded base solutions were obtained by filtering wet process base solutions derived from superphosphoric acid, which base solutions had been stored for a sufficient length of time for precipitation to occur. The MAPT solids used for seeding were washed with distilled water and methanol, and then dried in a vacuum oven at 70°–80 C. The ammonium phosphate base solutions to be processed were placed in closed 8 ounce wide mouth crystallizer bottles for conducting the seeding runs, and agitation was provided by the use of a magnetic stirrer. The temperature used during the runs was controlled by placing the crystallizer bottle containing the stirrer and solution in a controlled temperature oven in which the temperature was controlled to ±2° F. In each run, the amount of magnesium removed from the base solution was monitored by obtaining magnesium analyses on filtered solution samples at specified time intervals. To insure that the magnesium concentration was not changing as a result of water loss, the $P_2P_5$ concentration was also monitored.

EXAMPLE 1

An ammonium phosphate base fertilizer solution (10–34–0) was prepared at a pH of 6.2. Several samples of the base solution as thus prepared were placed in the wide mouth bottles equipped with magnetic stirrers as previously described.

In order to evaluate the effect of temperature upon the precipitation of MAPT from the seeded samples, each of the samples was placed in the temperature controlled oven maintained at different temperatures, ranging from 75° F. –125° F. to determine the optimum operating temperature for carrying out the process. Each of the samples was seeded with 5 weight percent MAPT crystals prepared in the manner previously described. The magnesium concentration of the samples was measured at several time intervals and averaged, and the result of these measurements is reproduced in table I.

TABLE I

| | Temperature | | | | | | | |
|---|---|---|---|---|---|---|---|---|
| | 75° F. | | 90° F. | | 100° F. | | 125° F. | |
| Elapsed time | Percent Mg | Percent MgO | Percent Mg | Percent MgO | Percent Mg | Percent MgO | Percent Mg | Percent MgO |
| 0 days | 0.27 | 0.45 | 0.27 | 0.45 | 0.27 | 0.45 | 0.27 | 0.45 |
| 3 days | .26 | .43 | .27 | .45 | .15 | .25 | .14 | .23 |
| 5 days | .23 | .38 | .26 | .43 | .12 | .20 | .10 | .17 |
| 7 days | 0.21 | 0.35 | 0.24 | 0.40 | 0.08 | 0.13 | 0.09 | 0.15 |

It will be noted in referring to table I that a sharp break occurs in the rate of magnesium salt precipitation at a temperature of between 90° and 100° F. No increase in effectiveness appears to occur for temperatures above 100° F. From the standpoint of economy and effectiveness, about 100° F. is therefore indicated by the results obtained to be the optimum temperature for carrying out the seeding of the base solutions. Moreover, since an undesirable rate of hydrolysis commences to occur in the solution at temperatures exceeding about 105° F., it is desirable to maintain the solution below this temperature.

EXAMPLE 2

In order to determine the effect of variation in the pH of the seeded base solution on the rates at which the magnesium concentration of the solution is reduced to tolerable levels, two samples of base solution analyzing 10.0–34.8–0 were freshly prepared at a pH of 5.5. The two samples were placed in an oven at a controlled temperature of 100° F. and seed crystals added to one of the samples at a level of 10 weight percent, and to the other sample at a level of 20 weight percent. Agitation was commenced and the temperature maintained constant. Periodic measurements of the magnesium concentration in the two solutions were made, and the results obtained are set forth in table II.

TABLE II

| | Magnesium concentration | | | |
|---|---|---|---|---|
| Elapsed Time (hrs.) | 10% Seed Crystals | | 20% Seed Crystals | |
| | % Mg | % MgO | % Mg | % MgO |
| 0 | 0.21 | 0.35 | 0.21 | 0.35 |
| 1 | 0.21 | 0.35 | 0.24 | 0.40 |
| 2 | 0.22 | 0.36 | 0.26 | 0.43 |
| 3 | 0.23 | 0.38 | 0.28 | 0.46 |
| 4 | 0.23 | 0.38 | 0.28 | 0.46 |
| 5 | 0.23 | 0.38 | 0.27 | 0.45 |
| 6 | 0.24 | 0.40 | 0.29 | 0.48 |
| 7 | 0.27 | 0.45 | 0.31 | 0.51 |

As may be seen by referring to table II, over an elapsed time of 7 hours, the magnesium concentration in both of the samples increased, indicating that magnesium seed crystals were going into solution at the lower pH of 5.5, rather than the seeding procedure initiating precipitation of the magnesium from the base solutions.

EXAMPLE 3

In order to check the possibility of increasing the precipitation rate at higher pH levels, samples were observed at pH levels between 6.2 and 7.0. No appreciable increase was noted in the rate of precipitation of magnesium salt from the solutions as a result of increasing the pH in the manner described.

EXAMPLE 4

In order to determine the effect of storage time upon the amount of magnesium removed from solution after seeding, several samples were made up, and seeding runs were carried out at a pH of 6.2 by adding 10 weight percent seed crystals to the base solutions in the several samples. The temperature of the samples was maintained at 100° F. At 4 hour intervals, the magnesium concentrations of several samples were measured and averaged. The results obtained are set forth in table III.

TABLE III

| Elapsed Time (hrs.) | Mg | MgO |
|---|---|---|
| 0 | 0.29 | 0.48 |
| 4 | 0.28 | 0.46 |
| 8 | 0.26 | 0.43 |
| 12 | 0.25 | 0.41 |
| 16 | 0.24 | 0.40 |
| 20 | 0.23 | 0.38 |
| 24 | 0.23 | 0.38 |
| 28 | 0.21 | 0.35 |
| 32 | 0.21 | 0.35 |
| 36 | 0.20 | 0.33 |
| 40 | 0.19 | 0.31 |
| 44 | 0.19 | 0.31 |
| 48 | 0.17 | 0.28 |
| 52 | 0.16 | 0.27 |
| 56 | 0.16 | 0.27 |
| 60 | 0.15 | 0.25 |
| 64 | 0.14 | 0.23 |

| | | |
|---|---|---|
| 68 | 0.14 | 0.23 |
| 72 | 0.15 | 0.25 |
| 4 days | 0.12 | 0.20 |
| 5 days | 0.10 | 0.17 |
| 7 days | 0.08 | 0.13 |

Figure 1:
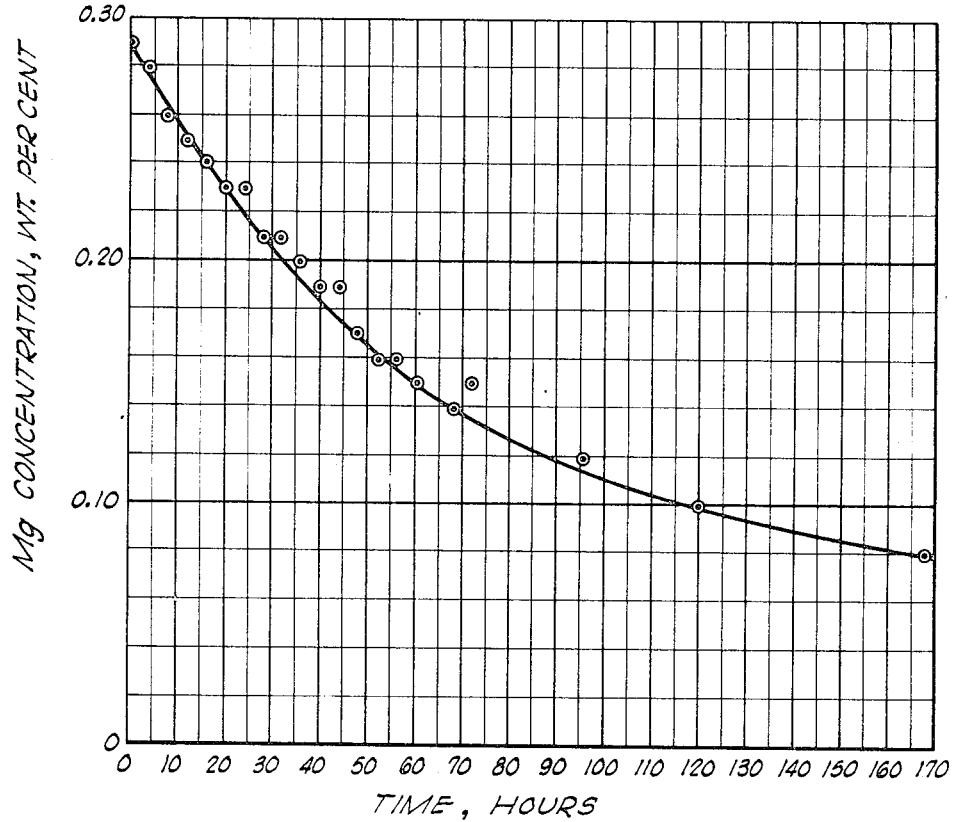
FIG. 1 is a graph illustrating the manner in which the magnesium concentration of a base fertilizer solution is decreased with time when the solution is subjected to the process of this invention.

A plot of the average magnesium concentration in the several samples against the elapsed storage time is set forth in FIG. 1. It will be noted that the 0.17 weight percent tolerance level for a 10–34–0 nonprecipitating base solution of ammonium phosphate was reached after a period of 5 days.

EXAMPLE 5

Crystallizer runs were made to determine if there would be any effect on the amount of magnesium removed from the base solution when the seed crystal level was varied between 2.5 weight percent and 10 weight percent. The results of these runs are shown in table IV.

TABLE IV

| | Magnesium concentration | | | | | | | |
|---|---|---|---|---|---|---|---|---|
| | 2.5% seed crystals | | 5.0% seed crystals | | 7.5% seed crystals | | 10.0% seed crystals | |
| Elapsed time | Percent Mg | Percent MgO | Percent Mg | Percent MgO | Percent Mg | Percent MgO | Percent Mg | Percent MgO |
| 0 days | 0.29 | 0.48 | 0.29 | 0.48 | 0.29 | 0.48 | 0.29 | 0.48 |
| 3 days | .14 | .23 | .12 | .20 | .12 | .20 | .14 | .23 |
| 5 days | | | | | | | .10 | .17 |
| 7 days | 0.07 | 0.12 | 0.7 | 0.12 | 0.07 | 0.12 | 0.08 | 0.13 |

As shown in table IV, no appreciable differences were noted in the amount of magnesium which was removed from the base solution when the seed crystal level was changed over the range of from 2.5 weight percent to 10 weight percent.

EXAMPLE 6

A crystallizer run was made on a quiescent 10–34–0 base solution, and upon the same base solution when agitated, to determine the effect of continual stirring upon the desired precipitation of magnesium salt. The results are set forth in table V and indicate the necessity of continuous agitation of the base solution in the crystallizer during seeding.

TABLE V

| | Magnesium concentration | | | |
|---|---|---|---|---|
| Elapsed Time | Stirred Solution | | Quiescent Solution | |
| | % Mg | % MgO | % Mg | % MgO |
| 0 days | 0.27 | 0.45 | 0.27 | 0.45 |
| 3 days | 0.14 | 0.23 | 0.27 | 0.45 |
| 5 days | 0.10 | 0.17 | 0.25 | 0.41 |
| 7 days | 0.09 | 0.15 | 0.22 | 0.36 |

EXAMPLE 7

In order to determine the effect of aging of the base solution upon the rate of removal of magnesium salts therefrom by the seeding process of the present invention, a fresh 10–34–0 ammonium phosphate base solution having a pH of 6.2 was prepared from wet superphosphoric acid and divided into two portions. One of these portions was placed in a wide mouthed crystallizer bottle, immediately, seeded and placed in a 100° F. oven. The other portion was stored at a temperature of 100° F. until a magnesium precipitate first appeared. The sample thus aged was then placed in the wide mouthed crystallizer botile, seeded and the accelerated precipitation due to seeding, temperature and pH control then observed. The results of these runs are set forth in table VI.

TABLE VI

| | Magnesium concentration | | | |
|---|---|---|---|---|
| Elapsed Time | "Fresh" Solution | | "Aged" Solution | |
| | % Mg | MgO | %Mg | % MgO |
| 0 hrs. | 0.27 | 0.45 | 0.24 | 0.40 |
| 2 hrs. | 0.27 | 0.45 | 0.21 | 0.35 |
| 4 hrs. | 0.26 | 0.43 | 0.19 | 0.31 |
| 6 hrs. | 0.26 | 0.43 | 0.17 | 0.28 |

In referring to table VI, it will be noted that essentially no magnesium ammonium pyrophosphate was precipitated from the fresh base solution over a 6 hour period following seeding. As contrasted with this, when the solution which had been aged for 11 days was seeded, an amount of magnesium precipitate equivalent to that obtained following about 2 days of seeding of a fresh solution was removed within a period of 6 hours.

In FIG. 2 of the drawings, there is schematically illustrated a method for continuously practicing the process of the present invention to produce a clarified base solution, typically of the 10–34–0 standard grade. As illustrated by the flow diagram of FIG. 2, raw 10–34–0 base solution which has been freshly prepared by the ammoniation of superphosphoric acid is continuously fed to a crystallizer container 10. In the crystallizer container 10, the base solution is held up for a period of from 3 to 5 days—that is, it has an average residence time in this container of 3 to 5 days. In the crystallizer container 10, the base solution is subjected to continuous agitation provided by a suitable stirring device 12. Continuously withdrawn from the container 10 at a point which is near the bottom of the container and relatively remote from the location at which the fresh base solution is continuously introduced to the container is an effluent base fertilizer solution having precipitated MAPT crystals entrained therein.

During the period of containment of the fresh base solution in the crystallizer container 10, the solution may be continuously seeded by recycling to the solution seed crystals obtained from the effluent stream drawn from the lower portion of the container. The seed crystals are recovered from this effluent by passing the effluent through a centrifuge 14 which separates the precipitated MAPT crystals from the liquid ammonium phosphate solution. These crystals have, of course, been precipitated from the fresh base solution during its holdup in the crystallizer container 10 as a result of the seeding process, and the maintenance of the temperature of the solution within the crystallizer container within the range described (from about 100° to about 105° F.) and at the pH which has been determined to be most effective for the desired precipitation.

Since all of the crystals which are separated from the solution in the centrifuge 14 will not be required for the seed crystal recycle, a portion of these seed crystals are divided from the recycle stream by means of any suitable separator device 16. They are then passed to a suitable filter 18 to remove any residual liquid therefrom, and are finally passed to storage as a relatively pure, dry solid MAPT product. This product is, in itself, useful for preparing solid fertilizers and constitutes a very valuable byproduct of the process of the invention.

The clarified and stable 10–34–0 standard base solution of ammonium phosphate is passed from the centrifuge 14 to storage preparatory to transshipment to points of sale or utilization. It is preferred, however, to adjust the pH of the clarified base solution downwardly to a value at least as low as 5.6 prior to storage, since this increases the tolerance of the solution for any residual magnesium salts not removed by precipitation. Nitric acid is preferably added to the solution to lower its pH to the desired value, since the addition of the acid effectively reduces the rate at which the base solution attacks and corrodes mild steel at the desired pH values. The nitric acid utilization can also be used to boost the nitrogen content of the base solution while concurrently lowering the pH.

It may be noted that, as heretofore described, a variant on the continuous process described in referring to FIG. 2 which may be desirably practiced in some instances entails the retention of the freshly prepared base solution in quiescent storage for a period of about 2 to 3 weeks prior to placing this solution in the crystallizer container 10 and subjecting it to the controlled seeding of the present invention. By such preaging, the retention time in the crystallizer container 10 can be reduced to 3 to 7 hours rather than the 3 to 5 days which are otherwise required. Operation in this manner is advantageous during off-seasons when the demand for the clarified liquid product is minimal, and the production of the raw base solution may easily run ahead of market demands.

Although certain preferred embodiments of the present invention have been hereinbefore described in order to provide an example of the manner in which the invention may be practiced sufficient for use by those of ordinary skill in the art, it is to be understood that various changes and innovations in the process parameters described, and in the equipment used for practicing the process, may be effected without departure from the basic principles of the invention. Changes and innovations of this type which continue to rely upon such basic principles are therefore deemed to be circumscribed by the spirit and scope of the invention except as the same may be necessarily limited by the appended claims or reasonable equivalents thereof.

What is claimed is:

1. A method of precipitating magnesium salts from a liquid ammonium phosphate fertilizer solution derived from wet superphosphoric acid to facilitate extended storage of such solution comprising seeding the solution with an effective amount magnesium ammonium phosphate crystals while agitating the solution, maintaining the temperature of the solution from about 100° to about 125° F. and the pH of the solution from about 6.2 to about 7 and subsequently separating the solution from the precipitated magnesium salt solids.

2. The method defined in claim 1 wherein the pH of the solution is maintained at about 6.2 during seeding.

3. The method defined in claim 1 wherein the temperature of the solution is maintained at from about 100° to about 105° F.

4. The method defined in claim 1 wherein the solution is seeded with from about 2.0 weight percent to 10 weight percent ammonium pyrophosphate tetrahydrate crystals.

5. The method of manufacturing a stable clarified liquid ammonium phosphate base fertilizer solution comprising:
continuously passing liquid ammonium phosphate base fertilizer solution through a container;
maintaining the solution in the container at a temperature of from about 100° to about 125° F., and at a pH of from about 6.2 to about 7;
continuously agitating the solution in the container;
continuously seeding the solution by adding an effective amount of crystals of a magnesium phosphate salt to the solution in said container to precipitate magnesium salts from the solution; and separating said precipitated magnesium salts from the solution.

6. The method defined in claim 5 wherein said solution is retained in said container for an average residence time of at least 3 days in the course of passing therethrough.

7. The method defined in claim 5 and further characterized as including the steps of:
quiescently preaging said solution for a period of from about 2 weeks to about 3 weeks before passing the solution through the container; and
retaining the solution in the container during its passage therethrough for a period not exceeding about 7 hours.

8. The method defined in claim 5 and further characterized to include the steps of:
continuously separating magnesium ammonium pyrophosphate salt from a mixture of base fertilizer solution and said salt leaving said container; and
continuously recycling at least a portion of said magnesium ammonium pyrophosphate salt to said container to constitute said crystals continuously added to said solution.

9. The method defined in claim 8 wherein the solution in the container is maintained at a temperature of from about 100° to about 105° F.

* * * * *